(12) United States Patent
Dederichs et al.

(10) Patent No.: US 8,493,388 B2
(45) Date of Patent: Jul. 23, 2013

(54) MODULAR VOLUME RENDERING USING VISUAL PROGRAMMING

(75) Inventors: Matthieu Dederichs, Nancy (FR); Klaus Engel, Donauwörth (DE); Daphne Yu, Yardley, PA (US)

(73) Assignee: Siemens Medical Solutions USA, Inc., Malvern, PA (US)

( * ) Notice: Subject to any disclaimer, the term of this patent is extended or adjusted under 35 U.S.C. 154(b) by 1491 days.

(21) Appl. No.: 11/835,508

(22) Filed: Aug. 8, 2007

(65) Prior Publication Data

US 2008/0136817 A1    Jun. 12, 2008

Related U.S. Application Data

(60) Provisional application No. 60/836,626, filed on Aug. 9, 2006.

(51) Int. Cl.
*G06T 15/60* (2006.01)

(52) U.S. Cl.
USPC .......................................... 345/426; 345/419

(58) Field of Classification Search
USPC ................................................. 345/419, 426
See application file for complete search history.

(56) References Cited

U.S. PATENT DOCUMENTS

| | | | | |
|---|---|---|---|---|
| 5,675,773 | A * | 10/1997 | Devic | 345/522 |
| 5,808,625 | A * | 9/1998 | Picott et al. | 345/440 |
| 6,496,190 | B1 * | 12/2002 | Driemeyer et al. | 345/619 |
| 7,176,917 | B1 * | 2/2007 | Morgan et al. | 345/426 |
| 7,548,238 | B2 * | 6/2009 | Berteig et al. | 345/426 |
| 2004/0025153 | A1 * | 2/2004 | Johnson et al. | 717/161 |
| 2004/0130552 | A1 * | 7/2004 | Duluk et al. | 345/506 |
| 2005/0039176 | A1 * | 2/2005 | Fournie | 717/156 |
| 2006/0107250 | A1 * | 5/2006 | Tarditi et al. | 717/105 |
| 2006/0132491 | A1 * | 6/2006 | Riach et al. | 345/505 |
| 2008/0266300 | A1 * | 10/2008 | Deering et al. | 345/502 |

OTHER PUBLICATIONS

Wilson et al., "Direct Volume Rendering via 3D Textures", Jun. 29, 1994.*
Kruger, J., Westermann, R., "Acceleration Techniques for GPU-based Volume Rendering", in Proceedings of IEEE Visualization '03 (2003), pp. 287-292.
Josie Wernecke, "The Inventor Mentor", Silicon Graphics 1994, Chapters 1 & 3, pp. 3-20 an pp. 35-77.

* cited by examiner

*Primary Examiner* — Jeffrey Chow
(74) *Attorney, Agent, or Firm* — Donald B. Paschburg (57) ABSTRACT

The rendering pipeline is divided into multiple components or modules in a scene graph based visual programming environment. Different stages of the rendering pipeline, such as data conversion, transform function, shading, and rendering, are grouped into independent conceptual modules, and each module is implemented by separate nodes in a scene graph. The user may select different nodes belonging to different modules for inclusion into the scene graph to program the rendering pipeline. The visual program is implicitly compiled and run using an application programming interface for hardware acceleration.

16 Claims, 3 Drawing Sheets

MODULAR VOLUME RENDERING USING VISUAL PROGRAMMING

RELATED APPLICATIONS

The present patent document claims the benefit of the filing date under 35 U.S.C. §119(e) of Provisional U.S. Patent Application Ser. No. 60/836,626, filed Aug. 9, 2006, which is hereby incorporated by reference.

BACKGROUND

The present embodiments relate to volume rendering. Interactive volume rendering is provided by powerful workstations with custom hardware architecture. The workstations are used for quality visualization without or with limited rendering artifacts. More recently, consumer graphics hardware allows interactive visualization at a low cost.

Hardware acceleration for volume rendering allows creation of new techniques for interactive visualization of 3D datasets, such as new rendering techniques. Each new technique brings new concepts or optimizations that contribute to visualization of a volume, such as in the field of medical imaging.

One example device for hardware acceleration is a graphics processing unit (GPU). GPU programming is used in scientific and other visualization. GPU programming offers new opportunities for processing and shading 3D volumes. As speed and flexibility increases within the field of consumer level graphics cards, hardware acceleration using consumer hardware is a growing research field within volume rendering.

For a given application, a rendering pipeline of the acceleration hardware is programmed. The monolithic code loads volume data, converters the volume data to texture, performs any classification, applies any shading, and renders to a two-dimensional display. Different options are available to the programmer for implementing the rendering process. The options are chosen based on the application, such as choosing a rendering style, frame rate, and shading appropriate for the relevant information. When a new application is desired, a new rendering pipeline is programmed into the acceleration hardware. This process is cumbersome. The ability to rapidly prototype a rendering pipeline or program is limited.

Some software framework may assist in rendering or programming. Open Inventor, by Silicon Graphics, Inc., provides a scene graph framework for programming in rendering. Different objects to be rendered may be separately formed and indicated as nodes in a scene graph. A monolithic rendering pipeline is applied as a single node in the scene graph for rendering the different objects. Scene graph creation can be further facilitated within a visual programming environment application. However, programming a new rendering pipeline is still cumbersome.

BRIEF SUMMARY

By way of introduction, the preferred embodiments described below include methods, systems, instructions, and computer readable media for dividing the rendering pipeline into multiple components or modules in a scene graph based visual programming environment. Different stages of the rendering pipeline, such as data conversion, transform function, shading, and rendering, are grouped into independent conceptual modules, and each module is implemented by separate nodes in a scene graph. The user may select different nodes belonging to different modules for inclusion into the scene graph to program the rendering pipeline. The visual program is implicitly compiled and run using an application programming interface for hardware acceleration.

In a first aspect, a computer readable storage medium has stored therein data representing instructions executable by a programmed processor for rendering a volume. The storage medium includes instructions for providing modules for different stages of volume rendering, receiving user selection of at least two modules, and volume rendering an image as a function of the at least two modules.

In a second aspect, a method is provided for programming a volume rendering process. Nodes for volume rendering are displayed in a visual programming environment. User selection of a plurality of the nodes is received. The plurality of the nodes defines a rendering process sequence in the visual programming environment.

In a third aspect, a system is provided for rendering a volume. A user input is operable to receive user selection of nodes and connections between the nodes. Each node is associated with a different volume rendering operation. A processor is operable to traverse through the nodes. A display is operable to display a scene graph of the nodes and connections and operable to display an image generated as a function of the processor traversing through the nodes.

The present invention is defined by the following claims, and nothing in this section should be taken as a limitation on those claims. Further aspects and advantages of the invention are discussed below in conjunction with the preferred embodiments and may be later claimed independently or in combination.

BRIEF DESCRIPTION OF THE DRAWINGS

The components and the figures are not necessarily to scale, emphasis instead being placed upon illustrating the principles of the invention. Moreover, in the figures, like reference numerals designate corresponding parts throughout the different views.

DETAILED DESCRIPTION OF THE DRAWINGS AND PRESENTLY PREFERRED EMBODIMENTS

A modular volume rendering environment allows the user to create a visualization application for three-dimensional images using programmable hardware. The volume rendering pipeline at the graphics hardware level is decomposed into several stages. The user is provided with convenient access to each one of these stages within the modular construct, with each module corresponding to programmable features of hardware provided by graphics boards. The tasks for each module are performed by one or more nodes within the scene graph. Within a visual programming environment, the nodes are connected to each other through a user interface and corresponding input devices to create the structure for transmitting pieces of information as well as establishing the processing sequence for the final rendering. The modules, and nodes within each conceptual module, are independent from each other. Different nodes can be combined together according to the users' direction and without the need of explicit recompilation of a monolithic program. A visualization application of three dimensional images is modularly built, allowing the user to prototype either a specific stage of the volume rendering pipeline or the final rendering image using Graphics Processing Unit (GPU) or other accelerator hardware programs. The prototyping and modification of volume rendering techniques may be easier and quicker using this modular design. The user may dynamically take advantage of GPU programs for rendering.

Figure 1:
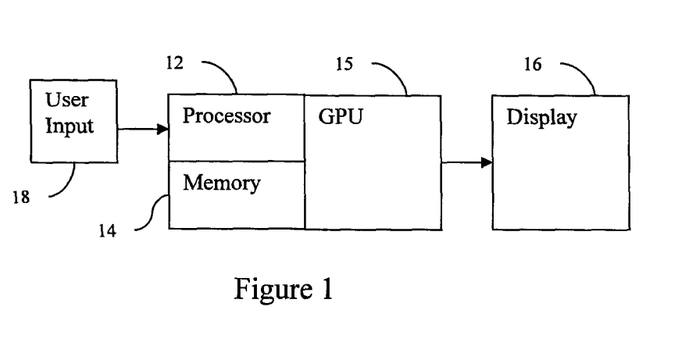
FIG. 1 is a block diagram of one embodiment of a system for visual programming a renderer and/or rendering a volume.

FIG. 1 shows a system for rendering a volume. The system includes a processor 12, a memory 14, a graphics processing unit 15, a display 16, and a user input 18. Additional, different, or fewer components may be provided. For example, a network or network connection is provided, such as for networking with a medical imaging network or data archival system.

The system is part of a medical imaging system, such as a diagnostic or therapy ultrasound, x-ray, computed tomography, magnetic resonance, positron emission, or other system. Alternatively, the system is part of an archival and/or image processing system, such as associated with a medical records database workstation or server. In other embodiments, the system is a personal computer, such as desktop or laptop, a workstation, a server, a network, or combinations thereof for rendering three-dimensional representations.

The system is used by a developer to create a renderer, rendering pipeline, or rendering program. Visual programming is used to select nodes for forming a rendering process. Alternatively or additionally, the system is an end user system for rendering. The visually programmed process is implemented. For example, a computer is used to develop a rendering pipeline and to render an image with the developed rendering pipeline. In one embodiment, the system includes two different computers, one used by the developer to visually program and compile a rendering process and another with acceleration hardware programmed to render from the developed program.

The display 16 is a monitor, LCD, projector, plasma display, CRT, printer, or other now known or later developed devise for outputting visual information. The display 16 receives images, graphics, or other information from the processor 12 and/or the graphics processing unit 15. The rendering or image generated by the processor 12 traversing through nodes of a visual program and the resulting programming of the graphics processing unit 15 provides an image for the display 16. The image is a representation of the volume being rendered.

The display 16 is also part of the user interface with the user input 18 or other source of input. The user input 18 is a keyboard, trackball, mouse, joystick, touch screen, knobs, buttons, sliders, touch pad, combinations thereof, or other now known or later developed user input device. The user input 18 generates signals in response to user action, such as user pressing of a button. The processor 12 or other user interface controller receives the input information from the user input 18.

The user interface allows for control of the rendering, such as setting viewing direction, adjusting scale, selecting data to be rendered, segmenting, or clipping. Activation of the rendering, compiling the visual program, or other rendering operations may be performed automatically or in response to user input.

In addition or as an alternative, the user interface is for visually programming the rendering. A scene graph of nodes and their connections, and a menu structure or list for selecting different nodes is shown to or created by the user. By navigating the user interface, the user selects nodes for programming the rendering process. For example, a Window® or other screen format includes an area for representing nodes and connections and another area for listing modules available for a given node, connection, or entire rendering process. As another example, the nodes are selected from a drop down or pop-up box in response to selection of a node. In another example, icons represent nodes, and the user moves and/or links the icons. The user input 18 receives the user selection of nodes, parameters for each node, and/or connections between the nodes.

A scene graph (e.g., tree, flow chart, chain, or other visual programming structure) in a visual workspace is created by the user with the user interface. The visual program structure is created from a template, by modifying a different structure, or from scratch. Each node of the scene graph is associated with a different volume rendering operation. By providing connections, parameters, and a layout or relative position of the nodes, the nodes and connections between the nodes define a rendering sequence. Each node operates in accordance with a module or modules. The modules correspond to the major stages within a volume rendering pipeline. For example, the different volume rendering operations include data loading, data conversion, shading, transfer function, and rendering. Additional, different, or fewer stages may be provided. Multiple rendering nodes may be provided for alternative implementation of each rendering operation, such as slicing and ray casting. The user selects the rendering node and selects the desired operation without affecting other operations within the scene graph. The node associates code or programming for the graphics processing unit 15 to perform the corresponding operation. The user may also select connections between nodes, such as disconnecting a node representing a type of operation not to be used for a particular rendering operation. One or more nodes may be automatically included in the scene graph, such as a root node and/or links between nodes.

The memory 14 is a graphics processing memory, a video random access memory, a random access memory, system memory, random access memory, cache memory, hard drive, optical media, magnetic media, flash drive, buffer, combinations thereof, or other now known or later developed memory device for storing data or video information.

The memory 14 stores one or more datasets representing a three-dimensional volume for rendering. Any type of data may be used for volume rendering, such as medical image data (e.g., ultrasound, x-ray, computed tomography, magnetic resonance, or positron emission). The rendering is from data distributed in an evenly spaced three-dimensional grid, but may be from data in other formats (e.g., rendering from scan data free of conversion to a Cartesian coordinate format or scan data including data both in a Cartesian coordinate format and acquisition format). The data is associated with different volume locations in a volume. Each volume location is the same size and shape within the dataset. Volume locations with different sizes, shapes, or numbers along a dimension may be included in a same dataset.

The dataset is provided in real-time with acquisition. For example, the dataset is generated by medical imaging of a patient. The memory 14 stores the data temporarily for processing. Alternatively, the dataset is generated from memory, such as associated with rendering a virtual object or associated with loading a previous scan of a patient.

The processor 12 is a central processing unit, control processor, application specific integrated circuit, general processor, field programmable gate array, analog circuit, digital circuit, combinations thereof, or other now known or later developed device for implementing a user interface and/or operating with graphics hardware for rendering. The processor 12 is a single device or multiple devices operating in serial, parallel, or separately. The processor 12 may be a main processor of a computer, such as a laptop or desktop computer, or may be a processor for handling some tasks in a larger system, such as in an imaging system.

The processor 12 operates the user interface. The processor 12 provides for visual programming. For example, a visual programming application is run by the processor 12. The application makes available the nodes, parameters, and connections.

Alternatively or additionally, the processor 12 programs and/or controls the graphics processing unit 15. By traversing through the nodes based on the connections, the processor 12 identifies code for programming the modules of the graphics processing unit 15. Code for a rendering application programming interface is compiled by traversal of the rendering sequence visually programmed by the user. The code is object oriented for controlling the data to be input and output from the different modules or code associated with the modules. Alternatively, other programming may be used. Any conflicts or ambiguities may be resolved or highlighted by the processor 12.

The graphics processing unit 15 is graphics acceleration hardware. Graphics accelerator, accelerator card, graphics chips, chipsets, boards, workstations, or other graphics acceleration hardware may be used. In one embodiment, the graphics processing unit 15 is a personal computer graphics accelerator card or components, such as manufactured by nVidia (e.g. Quadro4 or others), ATI (e.g. Radeon or others), or Matrox (e.g. Parhelia or others).

The graphics processing unit 15 accelerates volume rendering processes, such as using application programming interfaces for three-dimensional texture mapping. Example APIs include OpenGL and DirectX, but other APIs may be used independent of or with the graphics processing unit 15. APIs operating with or without texture mapping, vertex programming, fragment programming, and/or rasterization may be used. The code compiled by the processor 12 from the nodes includes API instructions for a volume rendering process. The graphics processing unit 15 is programmed using the compiled API instructions. Using the program, the graphics processing unit 15 renders an image.

The memory 14 and/or another memory stores instructions for operating the processor 12 and/or graphics processing unit 15. The instructions are for rendering a volume, such as uncompiled code from a visual program, compiled code from a visual program, API instructions, others, or combinations thereof. The instructions for implementing the processes, methods and/or techniques discussed herein are provided on computer-readable storage media or memories, such as a cache, buffer, RAM, removable media, hard drive or other computer readable storage media. Computer readable storage media include various types of volatile and nonvolatile storage media. The functions, acts or tasks illustrated in the figures or described herein are executed in response to one or more sets of instructions stored in or on computer readable storage media. The functions, acts or tasks are independent of the particular type of instructions set, storage media, processor or processing strategy and may be performed by software, hardware, integrated circuits, firmware, micro code and the like, operating alone, or in combination. Likewise, processing strategies may include multiprocessing, multitasking, parallel processing, and the like.

In one embodiment, the instructions are stored on a removable media device for reading by local or remote systems. In other embodiments, the instructions are stored in a remote location for transfer through a computer network or over telephone lines. In yet other embodiments, the instructions are stored within a given computer, CPU, GPU, or system.

Figure 2:
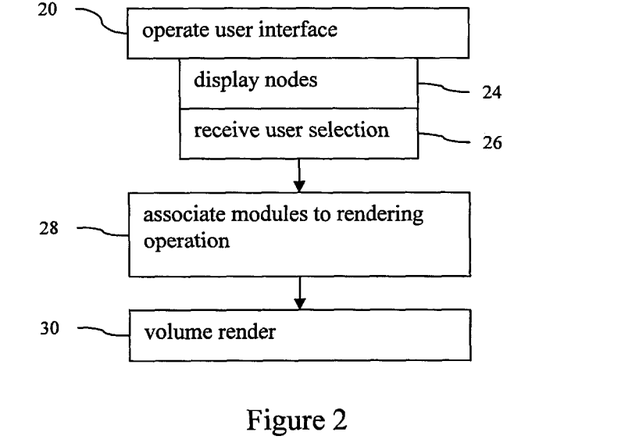
FIG. 2 is a flow chart diagram of one embodiment of a method for programming a volume rendering process and rendering from the program.

FIG. 2 shows a method for visually programming a volume rendering process and rendering a volume. The method is implemented by the system of FIG. 1 or another system. The method is performed in the order shown or other orders. Additional, different, or fewer acts may be provided. For example, the display of nodes and provision of modules are combined as one act. As another example, acts 20-28 are performed without the rendering act 30 or vise versa.

In act 20, a user interface is operated for visual programming. The objective of the prototyping environment is to allow the creation of volume rendering applications, which take advantage of programmable hardware. Based on a visual programming framework, the prototyping environment is composed of several modules. Nodes within the modules are selected to provide the application's architecture when used in the scene graph. The user creates a scene graph by selecting nodes, node parameters, and/or by creating nodes and connections.

The scene graph and corresponding collection of nodes provide a rendering pipeline or process. Certain nodes and associated modules may be required. For example, a node for geometry creation may be required to produce a rendering result. If a module is missing from the visual programming, a default module may be provided or used. Other nodes and associated modules may not be required, such as transform and shading. Rendering may be performed without classification or shading.

Figure 3:
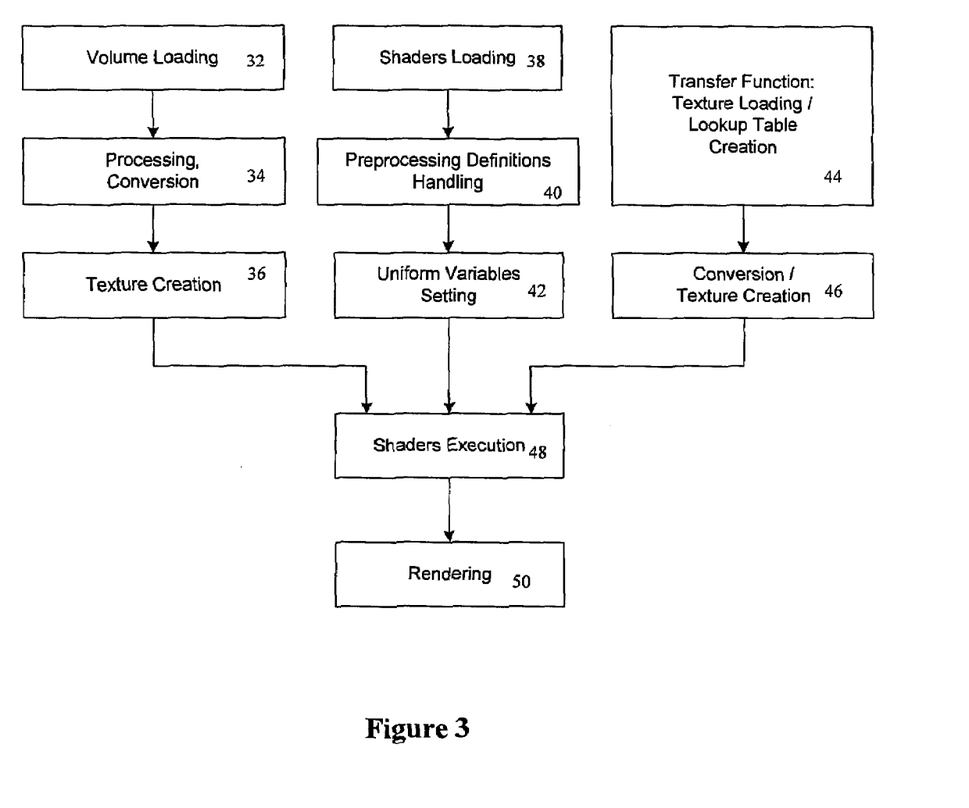
FIG. 3 is an example rendering pipeline associated with modular rendering within a visual programming environment.

FIG. 3 shows an example rendering pipeline. The pipeline includes three branches, shader execution 48, and rendering 50. For shader execution 48, inputs from the three branches are used. A first branch includes loading of the volume data, processing and/or conversion of the volume data 34 (e.g., interpolation to a three-dimensional grid and/or segmentation), and creation of a texture 36 for the converted data. The texture used for the data is provided for shader execution 48. A second branch includes loading a shader 38, handling preprocessing definitions 40, and setting uniform variables 42. The shader, definitions, and variables are provided for shader execution 48. A third branch includes a transfer function (e.g., creation of a look-up table and assignment of the look-up table to a texture of the GPU 15), and conversion of the transfer function to a texture 46. The texture, including the transfer function look-up table, is provided for shader execution 48. The shader executes based on the inputs. The shader is executed with the rendering 50 to generate an image. Different, fewer, or additional branches, operations, connections, flows, or pipelines may be provided.

Any of the branches and/or operations of the pipeline correspond to separate nodes. Alternatively, a node is provided for multiple operations of the pipeline and/or a branch. Two or more nodes are provided. Instead of a monolithic rendering module, program, or application, the rendering pipeline for rendering from volume data in divided into at least two components. The rendering process includes loading data and rendering the data, but may include other operations (e.g., data conversion, texture creation, shading, variable setting, preprocessing, classification (transform), clipping, or other operations). In one embodiment, the rendering process sequence includes nodes for two or more of data loading, data conversion, shading, transfer function, and rendering. Any division of the rendering process from loading to output of rendered image may be used. In one embodiment, the rendering process corresponds to the API functions of the graphics acceleration hardware. The rendering pipeline begins with the input to the hardware and ends with the output to the hardware. This pipeline is divided into two or more stages for visual programming of nodes (stages) with modules.

The user interface is operated in act 20 to program visually the rendering process. Nodes are displayed in act 24. The user selects nodes, and/or connections in act 26 to program visually the rendering pipeline.

The user interface includes a list of the nodes and a scene graph. The list is a single list, a plurality of sub-lists, or separate icons. Modules for different stages of volume rendering are provided in any manner. By providing more than one module, a list of nodes within the modules is provided. The list is provided in a separate Window® or area of the display. Alternatively, the list is provided in a same area as the scene graph.

The list of nodes within modules may be sub-divided. For example, the nodes appropriate for use with a particular module of the pipeline are listed, highlighted, or otherwise provided. Separate or overlapping lists of different nodes are provided for the different stages of the rendering process. The user selects the desired nodes for a given stage or module. By selecting different nodes for different stages, the system receives nodes for programming the rendering pipeline.

The nodes within modules are independent of each other, but have defined or programmable input and output relationships for passing information. Each node is associated with at least one function of the rendering process.

In act 24, the nodes are displayed as a list or icons. Alternatively or additionally, the nodes are provided in a group template. The user selects a group template, which may contain one or more nodes and their predefined parameters and connection relationships. The group template can be added to other parts of a new or existing scene graph, or as a base scene graph to which other nodes can be added. In other embodiments, the nodes are already provided in a scene graph for another rendering pipeline. By selecting parameters for each node, the user may modify the scene graph operations.

The user may select connections in act 26. Different nodes may communicate with more than one other node. The user selects connections to indicate the desired communications. For example, switchable operation is desired. The user selects a switching node. The switch node is placed above two or more nodes. In the downstream node, the user selects two or more possible nodes. The nodes are connected with the switching node, indicating operation of the rendering pipeline in alternative ways. The switching node or a different node may define the control input to determine which downstream node to use.

In one embodiment, the host of the visual programming environment is based on the Open Inventor scene graph principle. The modules take advantage of the traversal of the general graph structure in this environment. After operation of the user interface in act 20, the selected nodes, and/or connections are displayed in the scene graph. The scene graph is a two-dimensional visual representation of the selected modules. One-, three-, or four-dimensional visual representations may be used. The interconnections and/or relative position determine an order of operation.

Figure 4:
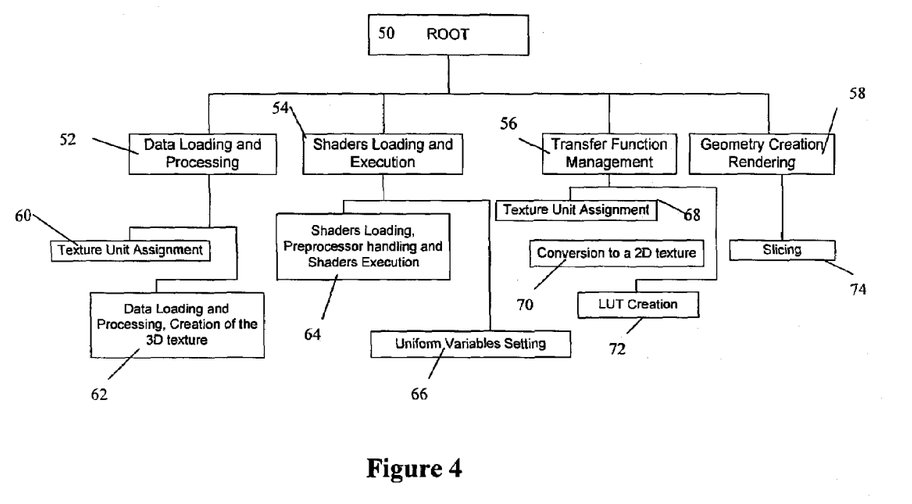
FIG. 4 is a graphical representation of a scene graph structure for modular volume rendering.

FIG. 4 shows one embodiment of a scene graph before or after selection of nodes. The scene graph includes nodes and/or modules with associated connections. The ROOT 50 represents the starting location of the rendering pipeline and/or the traversal of the visual program for compiling.

In the example shown, the rendering pipeline is decomposed into four general stages—data loading and processing 52, shader loading and execution 54, transfer function management 56, and geometry creation/rendering 58. Other divisions are possible. The user selects a node for each division. Alternatively, the user selects nodes for implementing these general stages by selecting nodes for the branches shown from the general stages.

For data loading and processing 52, texture unit assignment 60 and data loading and processing/creation of the 3D texture 62 nodes are provided. For shader loading and execution 54, shader loading, preprocessor handling, and shader execution 64 and uniform variable setting 66 nodes are provided. For transfer function management 56, texture unit assignment 68, conversion to a 2D texture 70, and LUT creation 72 nodes are provided. For geometry creation/rendering 58, a slicing 74 node is shown. Other nodes may be selected, such as ray casting.

Other divisions of any of the general stages may be used. Other general stages may be used. The user selects nodes for each of these modules. Alternatively, a module operable to implement the function of two or more nodes is selected.

One example stage is a texture definition stage. The available nodes for the texture definition stage correspond to code for conversion of volume data into a texture. The stage provides data handling or processing of the volume data to be rendered. The stage performs multiple functions or may be further decomposed into other stages.

Any imaging file format may be supported. Nodes are provided for handling different input formats and/or data source types. For example, RAW, DICOM, or other loaders are available in a list of nodes. The volume data is loaded using a RAW file loader (the voxels are contained in a unique file, following a specific representation), a single frame DICOM loader (each slice is represented by a file; the loader handles all the slice files that are present in the specified directory), or other loader. The loader may define a location and/or format of the data to be loaded.

The data to be loaded is processed. Depending on the source data type and the destination data type, the data is converted before creation of the texture. The conversion may be a separate node or combined with another function within other similar nodes. The data is processed for conversion to a format of the graphics acceleration hardware, such as a 3D OpenGL texture. The converted data is loaded into memory as a texture or other format, ready to be bound on geometry, later displayed using the rendering module, and accessed by the shader programs. In one embodiment, a node can process all the data and upload the data into the video memory internally, simply with a data volume as an input. In one embodiment, the data conversion and/or processing node may be operable in conjunction with a local or centralized resource manager. The task of a resource manager is to provide better control of resources such as storage media, random access memory, graphics memory or other resources such as shaders and GPU programs such that the amount and sequence of such resource utilization is optimally synchronized with the processing sequence.

In one embodiment, each node for the texture definition or data handling stage includes a plurality of options. Alternatively, different nodes are provided for different combinations of option settings. One option is enable/disable rendering. The user is allowed to toggle the display of a volume, in case the display may occlude others objects in the scene. Another option is data type conversion. The data sets may be represented using unsigned short components. Nevertheless, some big data sets may occupy a lot of video memory, which can prevent the user from loading other data. This option allows the user to reduce the size occupied by the volume in memory, in exchange for a small loss of quality. Resampling, bit size reduction, or other processes may be used to reduce the size. In another option, OpenGL Texture or other acceleration data options are provided. In the OpenGL example, in order to create an adequate texture, the user has the possibility to select the parameters that are going to be passed to the OpenGL texturing functions. The parameters may include the wrap function for the texture coordinates (e.g., type of wrap—clamping or repeating), the modulation function (combination with other textures) and the potential blend color.

In order to create nodes within modules that can be reusable for other purposes than volume rendering prototyping, the data texture module may also handle two and one-dimensional data as well. Consequently, this generic texture module may load 3D volumes, 2D textures, and 2D or 1D transfer functions texture files. Alternatively, separate nodes are provided for each or different combinations of options and/or functions.

The texture stage module may enable multi-texturing support. The user has the possibility to combine the 3D volume data with either other datasets (Fusion rendering) or with transfer functions' textures, which enables the classification mechanism to be applied to the data. For example, the module includes an option for assignment of different data to different textures. A field is available in the texture stage module. The field is an integer, such as in the range [0-31], since there are usually 32 texture units available on current graphics cards.

For Fusion or multiple volume rendering, fragment shaders and vertex programs in the programming language of OpenGL Shader Language (GLSL) or of other available languages such as High Level Shader Language (HLSL), may fuse together volumes in a large variety of visualization effects. In this case, each volume and its corresponding lookup table are bound to a different texture stage with its corresponding transformations. Each volume and lookup table is then combined and handled within the shader modules. Each of the volumes may represent data from different medical imaging modalities, or different segmentation of the volume.

Another example stage is the shader stage. One or more nodes are provided within the shader modules. The code of the shader module corresponds to vertex and/or fragment programs. The shader module includes options or other modules provide user input or selection of values of any uniform variables declared and used in the fragment programs. The user changes parameters within the shader programs without having to modify the source code by selecting different modules or inputting settings.

The shader nodes associated with the shader module declares preprocessor definitions. The user can prototype several algorithms in the GPU programs, and switch between them simply by adding or removing macros definitions. A single source with more than one version may be provided, such as the module including code for 8 bit or 16 bit operation. The preprocessing provides for automatic selection of the appropriate code (e.g., 8 or 16 bit) from the single source. This allows the user to have several variants of the same shader program in a single source file, and therefore improves the code maintainability and reduces code duplication. Alternatively, different modules are provided.

The visual programming environment gives the user the possibility to store several shader modules and/or nodes in the scene graph. A switching node switches between multiple shader nodes.

Each shader node may have two inputs—the vertex and fragment shaders (i.e., the paths to the actual files containing the code) and preprocessor definitions. Different or additional inputs may be used. The inputs are provided as node options or as separate nodes.

The preprocessor definitions are available for both vertex and fragment programs, and contain the macro definitions that are concatenated at the beginning of the source files before compilation. The preprocessor definitions feature allows the user to work on a single file for the vertex and the fragment programs, and to be able to change the function calls or the way an algorithm operates without having to change the source code. Preprocessor commands for execution before compiling allow for controlling the code to be compiled. For example, "#ifdef", "#elseif" and "#endif" macros that are available in GLSL, as well as in the common programming languages such as C or C++, are used.

Other options and/or separate nodes for use with the shader module include generic uniform variables. For example, generic uniform variable nodes are supplied. These nodes allow for dynamic parameter declaration and changes without creation of new modules for new parameters. A node is provided for each input. The number of variables or inputs is not limited. Alternatively, a node may be associated with a plurality of variables.

The user may be able to change the names and values of each variable on-the-fly. The change is persistent for other nodes using the same variable in accordance to the structural rules of the scene graph to assure proper communication. Alternatively, the naming conventions are restricted.

Another example stage is the transfer or classification stage. One or more modules and/or nodes are provided for the transfer stage. The transfer function assigns optical properties, such as color and opacity, to the scalar values contained in the 3D data fields. The code of the transfer module corresponds to the creation and the conversion of the transfer function lookup table. The transfer function is represented by an array that designates the optical properties (color and opacity) for the scalar values in the data set. The possible modules for selection may provide for different transfer functions, such as a module for enhancing skin and another module for enhancing bone.

To provide the desired transfer function, the node corresponds to code for accessing and/or creating a look-up table. For example, the transfer function is created using a lookup table creation module or by loading a 1D or 2D texture with a generic texture management module. The generic texture management module may be the module used to load the 3D medical image. The LUT Texture module fetches the transfer function's lookup table from Open Inventor or other source, and converts the function into a 2D OpenGL texture that may be accessed in the shader programs.

The transfer function node defines the function using parameters. For example, the input and output modes of the data (e.g., format), a ramp, an alpha, a slope, color definitions, or other parameters are specified. Alternatively, the look-up table is specified. One- or multi-dimensional transfer functions may be used.

The transfer function node assigns or is assigned a texture unit in an OpenGL embodiment. The transfer function is saved as a texture so that the shader programs using multi-texturing may access the transfer function. The transfer function module creates the texture and binds the texture with OpenGL.

Another example stage is the render stage. One or more nodes are provided for the render module. The code of the render node corresponds to rasterization. The data processed in the previous stages is gathered and rendered to display an image. In one embodiment, the code for the render stage modules programs the accelerator hardware using the OpenGL API.

By selecting the rendering node, the user visually programs the type of rendering performed. For example, a slicing technique is used for rendering. Slicing uses 2D or 3D-texture based methods. As another example, a ray casting technique is used. Ray casting renders a bounding box containing the non-empty regions of the dataset, which is ray casted using a fragment program. Any now known or later developed volume rendering may be used. For example, projection or surface rendering is used. In projection rendering, alpha blending, average, minimum, maximum, or other functions may provide data for the rendered image along each of a plurality of ray lines or projections through the volume. Diverging or parallel ray lines may be used for projection. Different nodes provide for different rendering.

The render module, and selected node, is independent from the previous modules. More than one render node may be provided for the rendering so that the application may switch between different rendering approaches.

Other modules, other nodes, other options for modules, other approaches to data loading, transfer function, data conversion, shading, rendering, and/or other rendering pipelines may be used. Different rendering hardware may implement different coding or API. The rendering process of the acceleration hardware is divided into any number of independent nodes with multiple modules available for selection for at least one of the nodes.

Referring again to FIG. 2, the nodes from the scene graph are associated with rendering operations in act 28. Two or more modules, which constitute the rendering pipeline or process, are associated with operation of a graphics processing unit. The code of the nodes is compiled. The code includes API instructions for programming the acceleration hardware. The code may dictate operations prior to or distinct from operations of the graphics processing unit. The code of each module is compiled on-the-fly without explicit execution by the user. Graphics hardware application programming interface code is compiled from the modules without user recompilation.

The code from each module is combined to provide the rendering process and program the accelerator hardware for rendering an image or images from one or more data sources. The compilation combines the programming into one program or is sequentially performed to operate the entire pipeline. Data to be output by one node for input from another node may be defined to provide operation of the rendering pipeline.

In one embodiment, the compiled shader program sets the GLSL program's handle (i.e. the identification number for the GLSL program) into the Open Inventor traversal state. The GLSL program is made available for the other modules, such as the uniform variables nodes, which allow the user to modify variables from the programs' source code. Using functions from OpenGL extensions, the nodes fetch the location of the variable (using its identifier), and set the corresponding value. Other visual programs, traversal programs, or organization for organizing the visually programmed modules into compiled code may be used.

In act 30, the rendering process sequence is performed. An image is volume rendered as a function of the nodes. The program traverses through the nodes and/or the code from the nodes is run after combination.

The dataset for rendering is received. The dataset is received from a memory, from a scanner, or from a transfer. The dataset is isotropic or anisotropic. The dataset is converted into voxels spaced along three major axes. The voxels have any shape and size, such as being smaller along one dimension as compared to another dimension. In the OpenGL embodiment, one or more textures are assigned or created from the voxels.

In this embodiment, the shader programs are loaded and executed. The user has then the possibility to interact with the shader programs using the uniform variables nodes. The uniform variable nodes allow the user to modify dynamically the uniform variables used in the vertex and fragment programs. The uniform variables are used when transfer functions are implemented, since the texture unit is defined for the shaders so that the textures are accessible in the code for the application or modulation of the values contained in the lookup table. After the compilation of the vertex and fragment programs, the geometry is created. The environment executes the vertex and fragment programs in the current rendering context. The 3D texture is bound in polygons. This geometry is then accessed and modified by the shader programs. At this point, the three-dimensional texture is processed in the shader programs, and the transfer function is used to assign color and opacity to the final image. In the example of FIG. 4, the rendering is a slicing node taking advantage of OpenGL 3D or 2D textures.

While the invention has been described above by reference to various embodiments, it should be understood that many changes and modifications can be made without departing from the scope of the invention. It is therefore intended that the foregoing detailed description be regarded as illustrative rather than limiting, and that it be understood that it is the following claims, including all equivalents, that are intended to define the spirit and scope of this invention.

We claim:

1. In a non-transitory computer readable storage medium having stored therein data representing instructions executable by a programmed processor for rendering a volume, the storage medium comprising instructions for:
    providing nodes for different stages of volume rendering, the different stages directed to different programmable features of hardware of a graphics board and the different stages including a shader stage, the nodes for the shader stage corresponding to vertex and fragment programs, a texture definition stage, the nodes for the texture definition stage corresponding to formatting volume data to a format of the hardware of the graphics board and conversion of the volume data into a texture, and a render stage, the nodes for the render stage corresponding to geometry creation, sampling, and rasterization;
    receiving user selection of at least two of the nodes; and
    volume rendering an image as a function of the at least two nodes.

2. The non-transitory computer readable storage medium of claim 1 wherein providing nodes comprises providing a list of different nodes for each of the different stages, and wherein receiving user selection comprises receiving user selection of at least one of the different nodes in the list for each of the different stages, the selected nodes independent of each other.

3. The non-transitory computer readable storage medium of claim 1 wherein providing and receiving comprises operating a user interface for visual programming, the user interface including a list of the nodes within modules and a scene graph visually representing the selected at least two nodes.

4. The non-transitory computer readable storage medium of claim 1 wherein volume rendering comprises traversing through the nodes.

5. The non-transitory computer readable storage medium of claim 1 wherein volume rendering comprises compiling graphics hardware application programming interface code from the at least two nodes without user recompilation.

6. The non-transitory computer readable storage medium of claim 1 further comprising:
associating each of the at least two nodes to operation of a graphics processing unit.

7. The non-transitory computer readable storage medium of claim 1 wherein the at least two nodes comprise nodes from different stages, the different stages comprising a rendering pipeline.

8. A method for programming a volume rendering process, the method comprising:
displaying, on a display by a processor, nodes for volume rendering in a visual programming environment; and
receiving, by the processor from a user input, user selection of a plurality of the nodes, the plurality of the nodes defining a rendering process sequence in the visual programming environment;
wherein the volume rendering process sequence includes nodes for each process of: data loading for volume data to be rendered, data conversion to a format of graphics hardware for creation of texture, shading for the volume rendering, transfer function for assigning color and opacity to scalar values contained in the volume data to be rendered, and rendering for rasterization, and wherein receiving user selection comprises receiving user selection of the nodes for the two or more processes.

9. The method of claim 8 wherein displaying comprises displaying a list of the nodes and a scene graph, the scene graph including the selected plurality of the nodes, node parameters, and connections between the selected plurality of the nodes.

10. The method of claim 8 wherein the plurality of nodes comprises a root node and at least one branch of two or more nodes.

11. The method of claim 8 wherein each of the plurality of nodes in the rendering process sequence corresponds to operation in a programmable hardware accelerator.

12. The method of claim 8 further comprising:
performing the rendering process sequence.

13. A system for rendering a volume, the system comprising:
a user input operable to receive user selection of nodes and connections between the nodes, each node associated with a different volume rendering operation, the different volume rendering operations including respective stages in rendering from a volume to a two-dimensional image, the stages being directed to different programmable features of graphics acceleration hardware, being other than shading and, including a texture definition stage, the nodes for the texture definition stage corresponding to formatting volume data to a format of the hardware of the graphics board and conversion of the volume data into a texture, and a render stage, the nodes for the render stage corresponding to geometry creation, sampling, and rasterization;
a processor operable to traverse through the nodes;
a display operable to display a scene graph of the nodes and connections, and operable to display an image generated as a function of the processor traversing through the nodes.

14. The system of claim 13 wherein the graphics acceleration hardware is configured to render as a function of output from the processor traversing through the nodes.

15. The system of claim 13 wherein the nodes and connections between the nodes define a rendering sequence, and wherein the processor is operable to compile a rendering application programming interface by traversal of the rendering sequence.

16. The system of claim 13 wherein the nodes define the different volume rendering operations, the different volume rendering operations including data loading, shading and transfer function.

\* \* \* \* \*